United States Patent
Lee et al.

(10) Patent No.: US 7,411,871 B2
(45) Date of Patent: Aug. 12, 2008

(54) OPTICAL DISK DRIVE

(75) Inventors: Jae-soo Lee, Seoul (KR); Byung-sam Son, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 890 days.

(21) Appl. No.: 10/897,072

(22) Filed: Jul. 23, 2004

(65) Prior Publication Data

US 2005/0044557 A1   Feb. 24, 2005

(30) Foreign Application Priority Data

Aug. 22, 2003 (KR) .................. 10-2003-0058291

(51) Int. Cl.
*G11B 7/085* (2006.01)
*G11B 17/03* (2006.01)

(52) U.S. Cl. ............... 369/30.27; 369/30.32; 720/606; 720/622

(58) Field of Classification Search ... 369/30.31–30.35, 369/30.27, 30.66, 30.28, 30.29, 30.94; 720/606, 720/622

See application file for complete search history.

(56) References Cited

U.S. PATENT DOCUMENTS

| 6,026,063 A * | 2/2000 | Ohba et al. ............... 369/30.28 |
| 2005/0039200 A1* | 2/2005 | Fujimura ..................... 720/622 |
| 2005/0141356 A1* | 6/2005 | Fujisawa ................. 369/30.27 |

* cited by examiner

*Primary Examiner*—Ali Neyzari
(74) *Attorney, Agent, or Firm*—Staas & Halsey LLP

(57) ABSTRACT

An optical disk drive including a sliding portion, which moves a sub frame upward or downward against a main frame; a sensor, which includes tension members which are provided in both sides of the sliding portion so that the tension members are elastically deformed to apply an additional load to the sliding portion when the sliding portion slides, and stopper members which contact the tension members and elastically deform the tension members when the sliding portion slides; and a controller, which senses a current change of a driving motor when the additional load is applied to the sliding portion, recognizes whether the tray is loaded or unloaded onto or from the main frame, and controls the driving motor.

30 Claims, 5 Drawing Sheets

OPTICAL DISK DRIVE

CROSS-REFERENCE TO RELATED APPLICATION

This application claims the priority of Korean Patent Application No. 2003-58291, filed on Aug. 22, 2003, in the Korean Intellectual Property Office, the disclosure of which is incorporated herein in its entirety by reference.

BACKGROUND OF THE INVENTION

1. Field of the Invention

The present invention relates to an optical disk drive, and, more particularly, to a sensor that senses whether a tray is loaded or unloaded onto or from a main frame.

2. Description of the Related Art

Generally, optical disk drives such as CD-ROM or DVDP are devices to recordor read information onto or from an optical disk.

FIG. 1 is an exploded perspective view showing a structure of a conventional optical disk drive, FIG. 2 is a perspective view showing a main frame shown in FIG. 1, and FIG. 3 is a side view of a sliding portion as viewed in the direction of an arrow of FIG. 2.

Referring to FIG. 1, the optical disk drive 100 includes a main frame 110, a tray 120, a sub frame 130, and a base chassis 140. The tray 120 is insertable into the main frame 110, includes a first resting portion 121 on which a 120 mm disk (not shown) is rested and a second resting portion 122 on which a 80 mm disk is rested, and delivers the rested disks into the main frame 110. The sub frame 130 is movably mounted in the main frame 110. The sub frame 130 supports the base chassis 10.

The base chassis 140 includes a turn table 141 on which an optical disk, which is rested on the tray 120 which is transferred into the main frame 110, is rested, a spindle motor (not shown) which is placed on the same axis as the turn table 141 and rotates the turn table 141, and an optical pickup device 142 which records information on the optical disk or reproduces information recorded on the optical disk while sliding in a radial direction of the optical disk rested on the turn table 141.

Referring to FIGS. 2 and 3, the main frame 110 includes a sliding portion 112, which slides in a state of being coupled with a driving device 111 in a direction which is perpendicular to the direction in which the tray 120 is inserted into the main body. The sliding portion 112 has two cam slots 115 (see FIG. 3). While a plurality of cam projections 131, formed on the sub frame 130 (see FIG. 1), slide according to the tracks of the cam slots 115, the sub frame 130 is rotated upward and downward while remaining centered on a rotation axis 132 supported by the main frame 110.

Also, the main frame 110 includes two switches 113 connected to a micom (not shown). The switches 113 recognize operations of the tray 120 and the sliding unit 112 by contacting or being detached to or from two contacts 114 formed on the sliding portion 112 and send a recognized signal to the micom (not shown) by which operations of the optical disk drive 100 are controlled.

In the conventional optical disk drive 100 with the above-described configuration, since components, each having respective predetermined tolerances, are assembled together, the tolerances create gaps between the respective components.

Particularly, due to gaps created between the respective components by tolerances existing between the sliding portion 112, the cam slots 115 and the cam projections 131, the contacts 114 formed on the sliding portion 112 cannot stably press the switches 113 formed on the main frame 110 when the sliding portion 112 moves upward and downward against the main frame 110, which prevents a smooth operation of the optical disk drive 100. That is, the switches 113 may recognize the operations of the optical disk drive 100 when they are firmly pressed by the contacts 114. However, since the gaps created by the tolerances prevent the switches 113 from being stably pressed by the contacts 114, a problem exists in that the switches 113 cannot correctly recognize the operations of the optical disk drive 100.

SUMMARY OF THE INVENTION

The present invention provides an optical disk drive including a sensor to recognize whether a tray is loaded or unloaded onto or from a main frame by detecting a current change of a driving motor.

According to an aspect of the present invention, an optical disk drive comprises a sliding portion, which is mounted in a main frame to slide on the main frame and move a sub frame upward or downward against the main frame when a tray is loaded or unloaded onto or from the main frame; a sensor, which includes tension members which are provided in both sides of the sliding portion so that the tension members are elastically deformed to apply an additional load to the sliding portion when the sliding portion slides, and stopper members which contact the tension members and elastically deform the tension members when the sliding portion slides; and a controller, which senses a current change of a driving motor when the additional load is applied to the sliding portion, and which recognizes whether the tray is loaded or unloaded onto or from the main frame, and controls the driving motor.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE PREFERRED EMBODIMENTS

Figure 1:
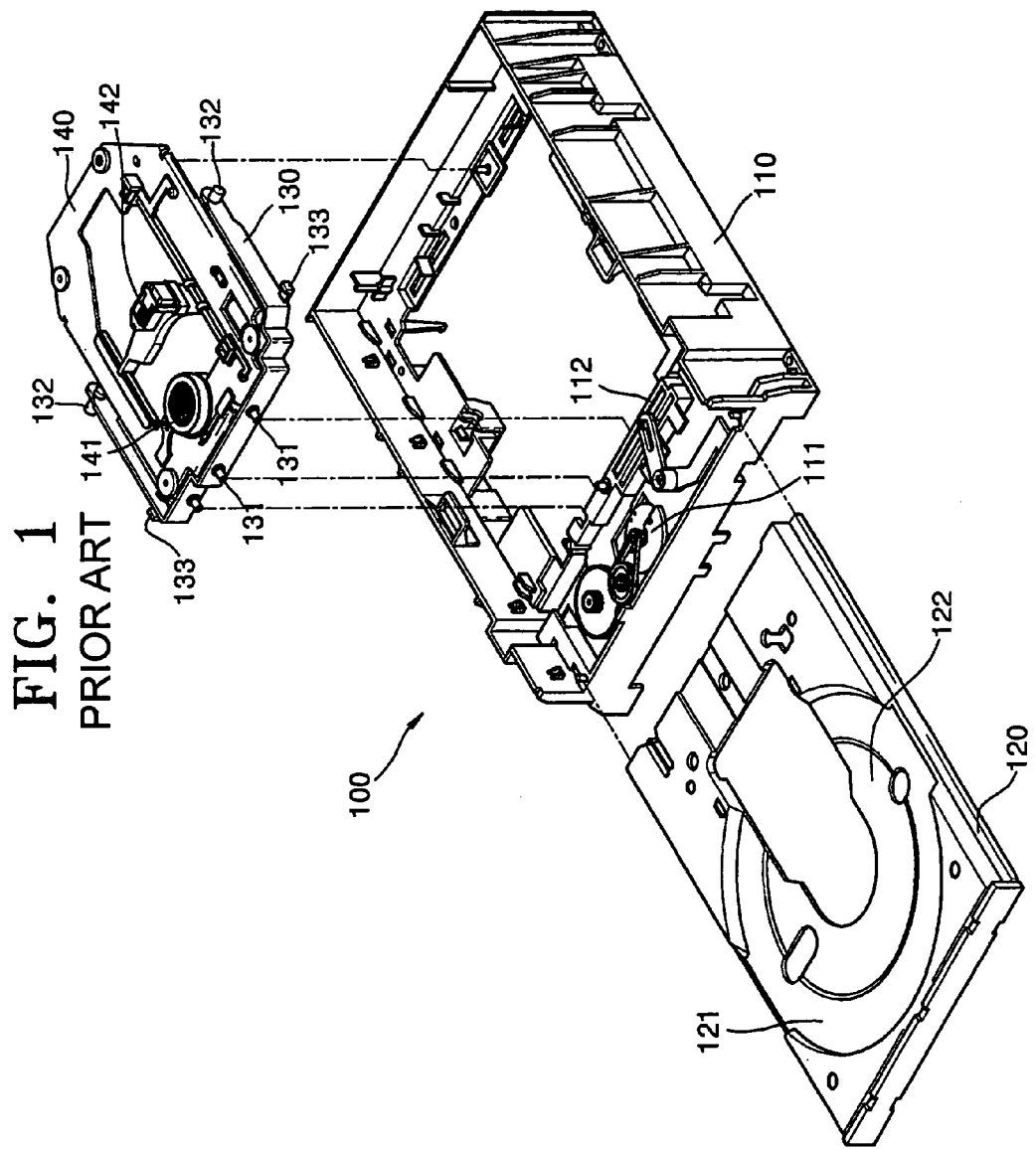
FIG. 1 is an exploded perspective view showing a structure of a conventional optical disk drive.
Figure 2:
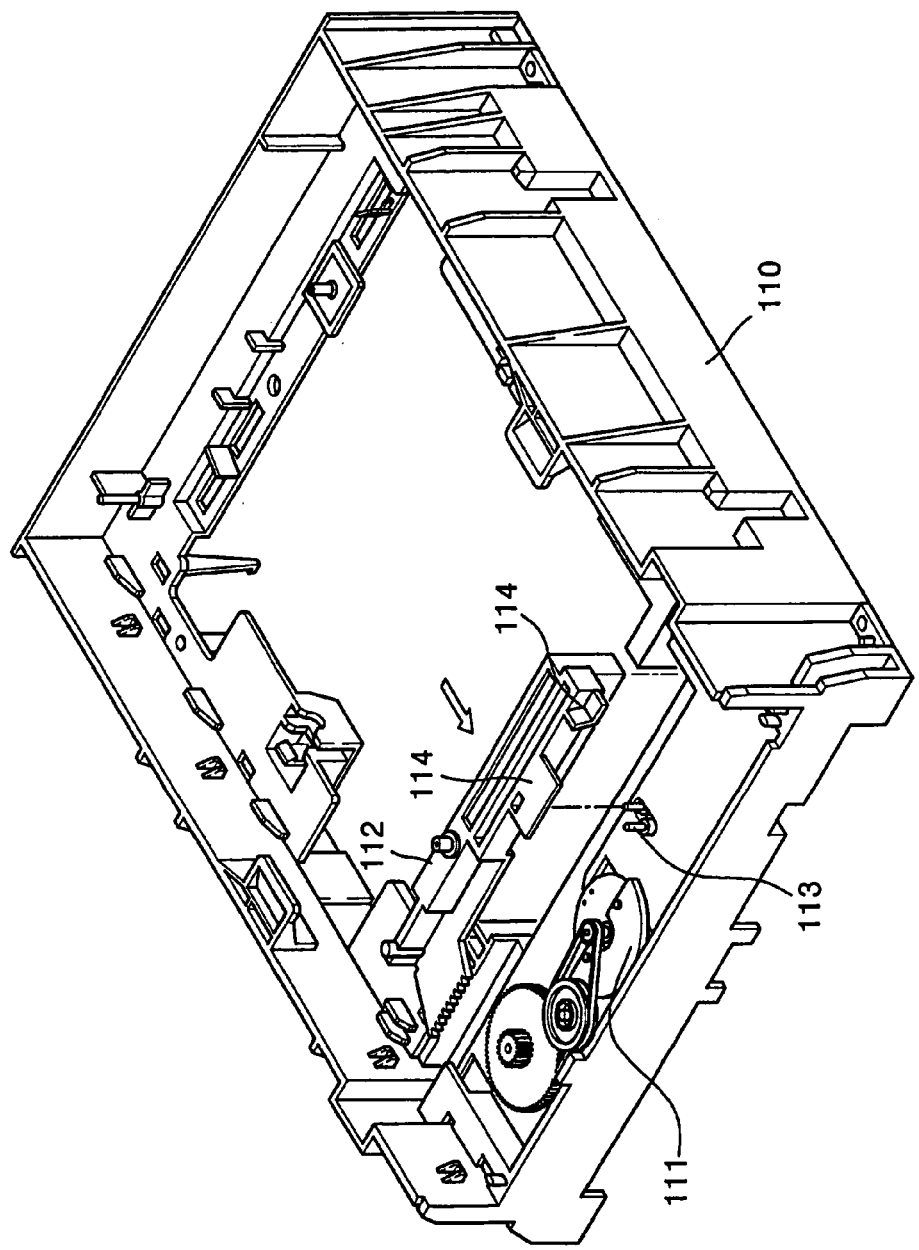
FIG. 2 is a perspective view showing a main frame shown in FIG. 1.
Figure 3:
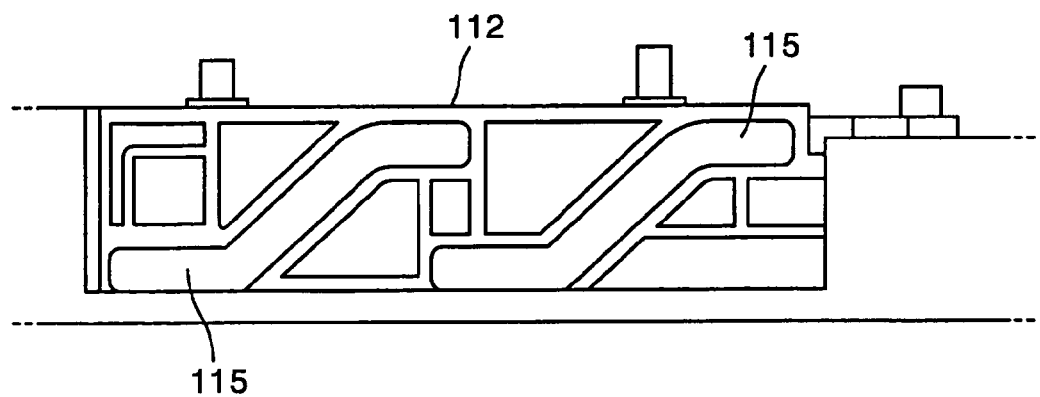
FIG. 3 is a side view showing a sliding portion as viewed in the direction of an arrow of FIG. 2.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
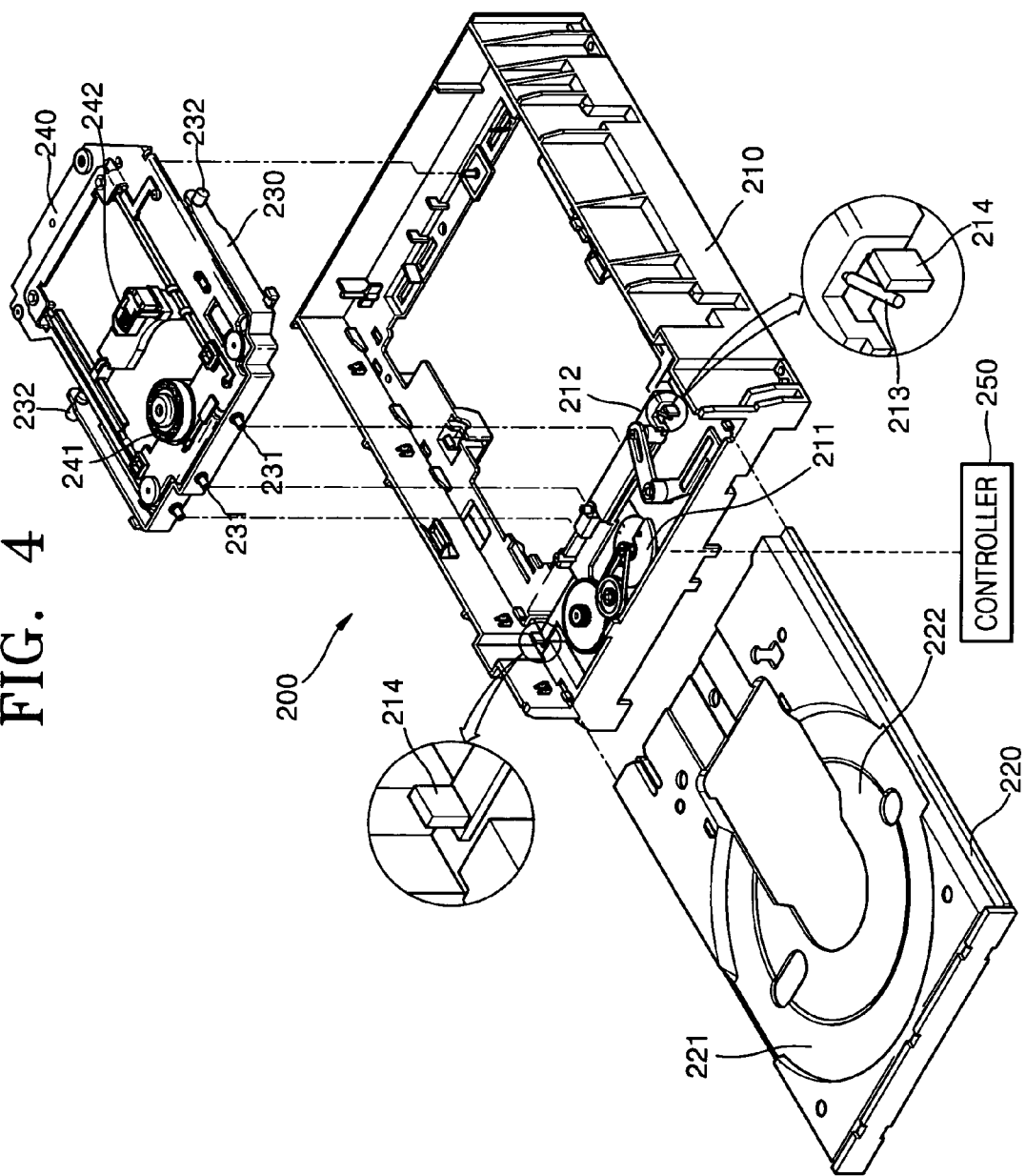
FIG. 4 is an exploded perspective view of an optical disk drive including a sensor according to an embodiment of the present invention.
Figure 5:
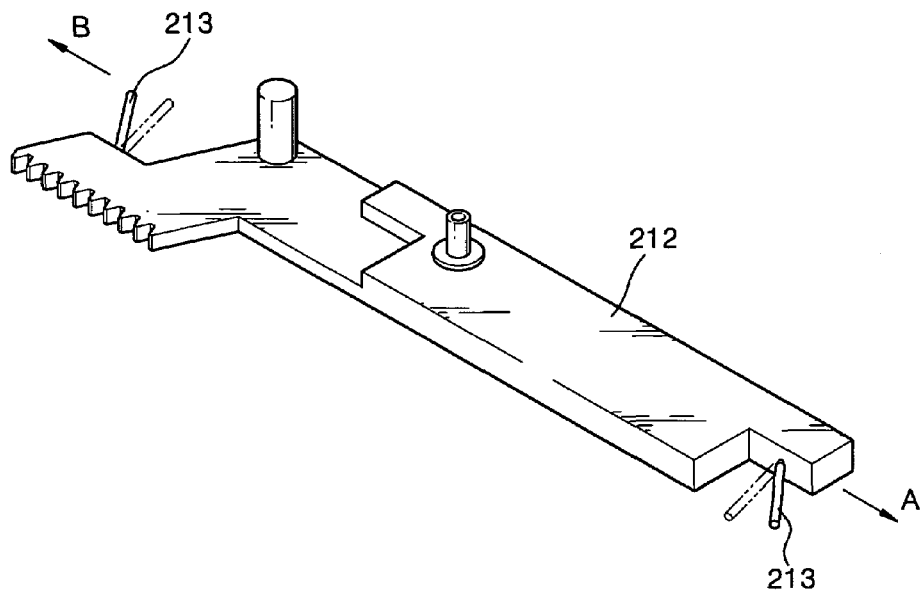
FIG. 5 is an enlarged perspective view of a sliding portion of FIG. 4.

Referring to FIGS. 4 and 5, an optical disk drive 200 comprises a main frame 210, a tray 220, a sub frame 230, a base chassis 240, and a sliding portion 212. The tray 220 includes a first resting portion 221 which is insertable into the main frame 210 and on which a 120 mm disk (not shown) is rested and a second resting portion 222 on which a 80 mm disk is rested, and delivers the rested disks to the main frame 210. The sub frame 230 is movably mounted in the main frame 210. The sub frame 230 supports the base chassis 240. A driving motor 211 drives the sliding portion 212 in a manner such that the sliding portion 212 is slid on the main frame 210. The sliding portion 212 slides in a direction that is perpendicular to the direction of the insertion of the tray 220 into the main frame 210. The driving motor additionally causes the sub frame 230 to rotate against the main frame 210.

The base chassis 240 includes a turn table 241 on which a disk, rested on the tray 220 and delivered into the main frame 210, is rested after delivery into the main frame 210. The base chassis 240 also includes a spindle motor (not shown) which is placed on the same axis as the turn table 241 to rotate the turn table 241. The base chassis 240 additionally includes an optical pickup device 242 which either records information on the disk or reproduces information recorded on the disk while sliding in a radial direction of the disk rested on the turn table 241.

A plurality of cam slots (not shown) are formed in the sliding portion 212. Cam projections 231 formed on the sub frame 230 slide according to the tracks of the cam slots, so that the sub frame 230 moves upward or downward while remaining centered on a rotation axis 232 supported by the main frame 210.

Tension members 213 are provided in both sides of the sliding portion 212 to project from the sliding portion 212. Alternately, the tension members 213 may be integrated with the sliding portion. An additional aspect of the tension members 213 is that they may have various shapes in addition to the illustrated cylindrical shape (see FIG. 5). The tension members 213 are elastically deformable so as to apply an additional load to the sliding portion 212 when the sliding portion 212 slides.

Also, stopper members 214 (see FIG. 4) are formed in the main frame 210 to be projected on a path on which the sliding portion 212 slides. In an embodiment of the invention, the stopper members 214 are block shaped, although, like the tension members 213, the stopper members 214 may take on various shapes. As a result of this configuration, while the sliding portion 212 slides, the portions of the stopper members 214 that contact the tension members 213 elastically deform the tension members 213.

The tension members 213 are preferably elastically deformed in an opposite direction of a direction in which the sliding portion 212 slides.

A controller 250 is connected to the driving motor 211. The controller 250 senses a current change of the driving motor 211 caused by an additional load applied to the sliding portion 220 through the tension members 213, when the tray 220 is loaded or unloaded onto or from the main frame 210, to thereby recognize whether the tray 220 is loaded or unloaded onto or from the main frame 210 and control the driving motor 211.

Hereinafter, how the controller senses whether the tray is loaded or unloaded onto or from the main frame will be described with reference to the appended drawings.

Figure 6:
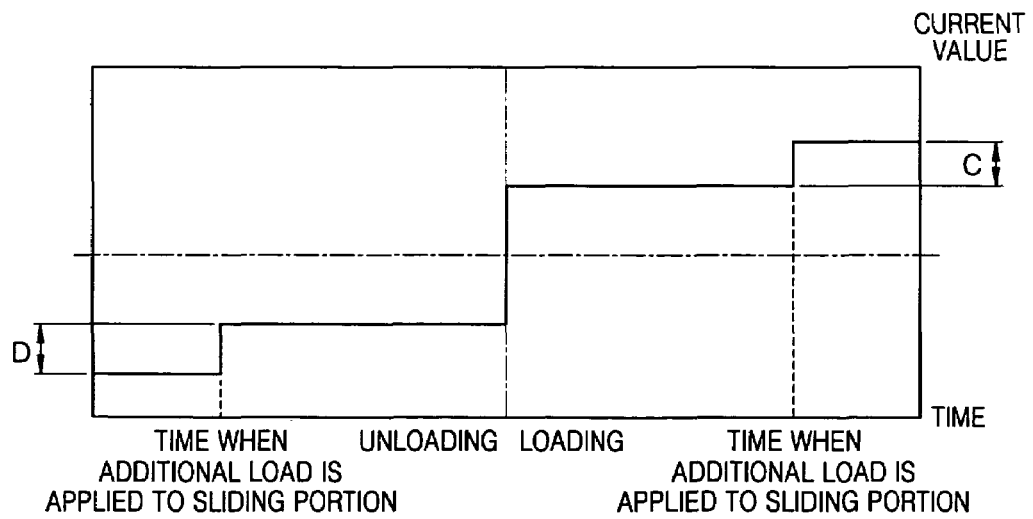
FIG. 6 is a graph illustrating a temporal change in the current of a driving motor when a tray is loaded or unloaded on/from a main frame.

Referring to FIGS. 4 through 6, when the driving motor 211 is rotated forward, the tray 220 is loaded on the main frame 210. The sliding portion 212 slides in a direction of an arrow A as shown in FIG. 5. At this time, a current value applied to the driving motor 211 is uniform as illustrated in FIG. 6.

Referring to FIG. 6, at the time when the tray 220 is loaded on the main frame 210, the tension members 213 contact the stopper members 214 to move from the location of the solid line to the location of the dotted line (See FIG. 5), so that an additional load is applied to the sliding portion 212. At this time, a current value applied to the driving motor 211 increases by a value of C as illustrated in FIG. 6.

The additional load applied to the driving motor 211 causes the increase of the current value of the driving motor 211. Such an increased current value indicates that the tray 220 is completely loaded on the main frame 210.

Accordingly, the controller 250 recognizes that the tray 220 is completely loaded on the main frame 210 when the current value of the driving motor 211 abruptly increases, after a predetermined time is elapsed from a time when the tray 220 is loaded on the main frame 210.

If a time interval from a time when the tray 220 is loaded on the main frame 210 to a time when the current value of the driving motor 211 increases is smaller than the predetermined time, the controller 250 recognizes that an abnormal load is generated in the state where the tray 220 is not completely loaded on the main frame 210. The controller 250 then controls the driving motor 211 so as to correct for the abnormal load.

On the contrary, when the driving motor 211 is rotated, for example, backward, the tray 220 is unloaded from the main frame 210. The sliding portion 212 slides in a direction of an arrow B as shown in FIG. 5. At this time, a current value applied to the driving motor 211 is uniform as illustrated in FIG. 6.

At the time when the tray 220 is unloaded from the main frame 210, the tension members 213 contact the stopper members 214 to move from the location of the solid line to the location of the dotted line (see FIG. 5) so that an additional load is applied to the sliding portion 212. At this time, the current value applied to the driving motor 211 increases by a value of D as shown in FIG. 6.

The additional load applied to the driving motor 211 causes the increase of the current value of the driving motor 211. Such an increased current value indicates that the tray 220 is completely unloaded from the main frame 210.

Accordingly, the controller 250 recognizes that the tray 220 is completely unloaded from the main frame 210 when the current value of the driving motor 211 abruptly increases after a predetermined time is elapsed from a time when the tray 220 is unloaded from the main frame 210.

If a time interval from a time when the tray 220 is unloaded from the main frame 210 to a time when the current value of the driving motor 211 increases is smaller than the predetermined time, the controller 250 recognizes that an abnormal load is generated in the state where the tray 220 is not completely unloaded from the main frame 210. The controller 25 then controls the driving motor 211 to be deviated from the abnormal load.

As is described above, according to the optical disk drive of the present invention, it is possible to simplify the structures of components as well as to prevent a touch-sensitive sensor from performing an error in operation due to its tolerances.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disk drive comprising:
   a sliding portion, which is mounted in a main frame to slide on the main frame and move a sub frame upward or downward against the main frame when a tray is loaded or unloaded onto or from the main frame;
   a sensor, which includes tension members which are provided in both sides of the sliding portion so that the tension members are elastically deformed to apply an additional load to the sliding portion when the sliding portion slides, and stopper members which contact the tension members and elastically deform the tension members when the sliding portion slides; and
   a controller, which senses a current change of a driving motor when the additional load is applied to the sliding portion and which recognizes whether the tray is loaded or unloaded onto or from the main frame, and controls the driving motor.

2. The optical disk drive of claim 1, wherein the tension members are projected in both sides of the sliding portion.

3. The optical disk drive of claim 2, wherein the tension members are elastically deformed in an opposite direction of a direction in which the sliding portion slides.

4. The optical disk drive of claim 1, wherein the stopper members are formed in the main frame on a path on which the sliding portion slides.

5. The optical disk drive of claim 1, wherein the tension members are integrated with the sliding portion.

6. An optical disk drive, including a main frame, a tray to be loaded or unloaded to and from the main frame, a driving motor, and a sub frame to be moved upward or downward against the main frame when the tray is loaded or unloaded, comprising:
   a sliding portion that is slideably mounted in the main frame and driven by the driving motor so as to move the sub frame upward or downward, the sliding portion having first and second sides;
   a sensor, including tension members on both of the sides of the sliding portion so that the tension members are elastically deformed so as to apply an additional load to the sliding portion when the sliding portion slides, and stopper members which contact the tension members and elastically deform the tension members when the sliding portion slides; and
   a controller, which senses a current change of the driving motor when the additional load is applied to the sliding portion and which controls the driving motor based on the sensed current change of the driving motor.

7. The disk drive according to claim 6, wherein the tension members respectively project from both sides of the sliding portion.

8. The disk drive according to claim 6, wherein the tension members are respectively integrated with both sides of the sliding portion.

9. The disk drive according to claim 6, wherein the tension members are cylindrical and project from the sliding portion in an axial direction.

10. The disk drive according to claim 6, wherein the tension members are elastically deformed in an opposite direction of a direction in which the sliding portion slides.

11. The disk drive according to claim 6, wherein the stopper members are formed in the main frame on a path on which the sliding portion slides.

12. The disk drive according to claim 6, wherein the main stoppers are block shaped.

13. The disk drive according to claim 6, wherein the tension members are integrated with the sliding portion.

14. The disk drive according to claim 6, wherein, when the controller senses a current change, the controller recognizes that the tray is loaded or unloaded onto or from the main frame.

15. An optical disk drive, including a main frame, a tray to be loaded or unloaded to and from the main frame, a driving motor, and a sub frame to be moved upward or downward against the main frame when the tray is loaded or unloaded, comprising:
   a sliding portion that is slideably mounted in the main frame and driven by the driving motor so as to move the sub frame upward or downward, the sliding portion having first and second sides;
   tension members to protrude from both of the sides of the sliding portion and to be elastically deformed when the sliding portion slides so as to apply an additional load to the sliding portion; and
   a controller, to sense a current change of the driving motor when the additional load is applied to the sliding portion, and which controls the driving motor based on the sensed current change of the driving motor.

16. The disk drive according to claim 15, wherein the tension members respectively project from both sides of the sliding portion.

17. The disk drive according to claim 15, wherein the tension members are respectively integrated with both sides of the sliding portion.

18. The disk drive according to claim 15, wherein the tension members are cylindrical and protrude from the sliding portion in an axial direction.

19. The disk drive according to claim 15, wherein the tension members are elastically deformed in an opposite direction of a direction in which the sliding portion slides.

20. The disk drive according to claim 15, further comprising stopper members to elastically deform the tension members, wherein the stopper members are formed in the main frame on a path on which the sliding portion slides.

21. The disk drive according to claim 15, wherein the main stoppers are block shaped.

22. The disk drive according to claim 15, wherein the tension members are integrated with the sliding portion.

23. The disk drive according to claim 15, wherein, when the controller senses a current change, the controller recognizes that the tray is loaded or unloaded onto or from the main frame.

24. A method of sensing whether a tray, having tension members, is loaded into a main frame of a disk drive, including a controller, by a driving force of a driving motor, comprising:
   rotating the driving motor forward so as to load the tray onto the main frame so as to supply a uniform current to the controller;
   causing a deformation of the tension members as the tray is loaded onto the main frame so as to increase the current supplied to the controller; and
   determining whether the tray is completely loaded onto the main frame based on the length of time the increased current value is supplied to the controller.

25. The method according to claim 24, further comprising providing a sliding portion to slide in accordance with a movement of the tray.

26. The method according to claim 25, wherein the causing the deformation of the tension members applies as additional load to the sliding portion.

27. The method according to claim 26, further comprising increasing a current value in accordance with an amount of the additional load.

28. The method according to claim 24, wherein the determining comprises counting a time interval from when the rotating begins to when the causing, so as to increase the current supplied to the controller, occurs.

29. The method according to claim 28, further comprising determining that an abnormal loading occurs if the counted time is less than a predetermined time.

30. The method according to claim 24, wherein a reverse method to sense whether the tray is unloaded from the main frame comprises:
- rotating the driving motor in reverse so as to unload the tray from the main frame so as to supply a uniform current to the controller;
- causing a deformation of the tension members as the tray is unloaded from the main frame so as to increase the current supplied to the controller; and
- determining whether the tray is completely unloaded from the main frame based on the length of time the increased current value is supplied to the controller.

* * * * *